United States Patent [19]

Yoshimoto et al.

[11] Patent Number: 4,526,659

[45] Date of Patent: Jul. 2, 1985

[54] METHOD OF ELECTRODEPOSITING HEXACYANO-COBALT IRON COMPLEX

[75] Inventors: Teruko Yoshimoto, Fujisawa; Mikio Kawai, Yokohama; Hitoshi Kunimi, Yokosuka, all of Japan

[73] Assignee: Nissan Motor Co., Ltd., Yokohama, Japan

[21] Appl. No.: 655,557

[22] Filed: Sep. 28, 1984

[30] Foreign Application Priority Data

Oct. 6, 1983 [JP] Japan ................................ 58-185837

[51] Int. Cl.³ ............................................... C25B 1/00
[52] U.S. Cl. ..................................... 204/56 R; 204/91
[58] Field of Search .................. 204/91, 56 R, DIG. 9

[56] References Cited

U.S. PATENT DOCUMENTS 4,451,339 5/1984 Kranz et al. ............................ 204/91
4,466,867 8/1984 Haberman et al. .................... 204/91

Primary Examiner—R. L. Andrews
Attorney, Agent, or Firm—Schwartz, Jeffery, Schwaab, Mack, Blumenthal & Evans

[57] ABSTRACT

A method of electrodepositing a hexacyano-cobalt iron complex of the general formula $Fe_x[Co(CN)_6]_y$, where $3 \leq x \leq 4$ and $2 \leq y \leq 3$, which serves as an electrochromic material high in memory effects and quick in response. A film of the cyano-complex is electrodeposited from an aqueous mixed solution of $K_3[Co(CN)_6]$ and an iron(III) salt such as $FeCl_3$. During the electrolytic reduction process the cathode potential is periodically increased and decreased over a predetermined range, preferably from $-0.2$ to $+1.2$ V, to stably accomplish electrodeposition to thereby obtain an electrochromic film which is uniform in physical properties and even in the tone and tint of the color. The sweep of the cathode potential may be made in the manner of a saw-tooth wave, rectangular wave or sinusoidal wave.

7 Claims, 7 Drawing Figures

METHOD OF ELECTRODEPOSITING HEXACYANO-COBALT IRON COMPLEX

BACKGROUND OF THE INVENTION

This invention relates to a method of electrodepositing a hexacyano-cobalt iron complex, which is expressed by the general formula (I) and serves as an excellent electrochromic material:

$$Fe_x[Co(CN)_6]_y \qquad (I)$$

where $3 \leq x \leq 4$ and $2 \leq y \leq 3$.

Our Japanese patent application No. 58-36570 filed on Mar. 8, 1983 discloses that a hexacyano-cobalt iron complex of the general formula (I) serves as an electrochromic material, which is colorless in the reduced state and assumes yellow color in the oxidized state and which is high in memory effects and quick in response. According to the Japanese patent application, a film of the hexacyano-cobalt iron complex is electrodeposited on a tin dioxide electrode, for example, from an aqueous mixed solution containing 0.01 mole/liter of potassium cobalt hexacyanide $K_3[Co(CN)_6]$ and 0.01 mole/liter of an iron(III) salt such as ferric chloride by performing electrolytic reduction at a constant current density of 0.05 mA/cm².

However, we have encountered some problems in the electrolytic reduction process for the electrodeposition of the hexacyano-cobalt iron complex. Sometimes the electrodeposited film of the cyanocomplex is not uniform in physical properties and exhibits unevenness in the tone or tint of the color of the film. This tendency becomes significant when electrodepositing the cyano-complex as an electrochromic film for use in a relatively large-sized electrochromic display device. Besides, in industrial practice of the electrolytic reduction process the efficiency of electrodeposition is rather unstable so that the obtained electrochromic films are liable to become significantly different in the quantity of electricity. In some experiments on a large number of hexacyano-cobalt iron complex films electrodeposited under the same conditions, the dispersion of the electrodeposition efficiency was found to be as large as 40 to 100% from the measurements of the quantities of electricity of the respective films in an electrolyte solution containing 1 mole/liter of sodium perchlorate dissolved in propylene carbonate.

SUMMARY OF THE INVENTION

It is an object of the present invention to solve the above described problems in the electrodeposition of a cyano-complex of the general formula (I) by providing an improved electrolytic reduction method.

The present invention provides an improved method of electrodepositing a hexacyano-cobalt iron complex expressed by the general formula (I) by electrolytic reduction from an aqueous mixed solution of an iron-(III) salt and potassium cobalt hexacyanide, the method being characterized in that during electrolytic reduction the cathode potential is swept so as to periodically increase and decrease over a predetermined range.

In this method it is preferred to sweep the cathode potential over the range from about $-0.2$ V to about $+1.2$ V. The manner of the sweep of the cathode potential is not particularly limited. For example, the potential may be increased and decreased in the manner of a saw-tooth have, rectangular wave or sinusoidal wave.

The sweep of the cathode potential in the method according to the invention is effective in stably electrodepositing a film of the hexacyano-cobalt iron complex on the cathode, so that the cyano-complex films formed by this method are uniform in the physical properties and very even in the tone and tint of the color, and small in the dispersion of the quantities of electricity when used in electrochromic display devices.

DETAILED DESCRIPTION OF THE INVENTION

We have not yet elucidated the true reasons for stabilization of the electrodeposition of the hexacyano-cobalt iron complex realized by out method in which the cathode potential is swept as stated hereinbefore, but probably a primary reason will be as follows.

In the electrolytic reduction process for the formation of a hexacyano-cobalt iron complex of the general formula (I), the initial reaction which takes place at the cathode surface is a reduction reaction represented by equation (1);

$$X + e \rightarrow X^- \qquad (1)$$

where X represents one of $Fe^{3+}$ and $[Co(CN)_6]^{3-}$, and the rate of this reaction (1) is assumed to be k.

Next, a reaction represented by equation (2) takes place:

$$aX^- bY \rightarrow X_a - Y_b \qquad (2)$$

where Y represents one of $[Co(CN)_6]^{3-}$ and $Fe^{3+}$, and $X_a - Y_b$ represents $Fe_x[Co(CN)_6]_y$, and the rate of this reaction (2) is assumed to be k'.

Figure 1:
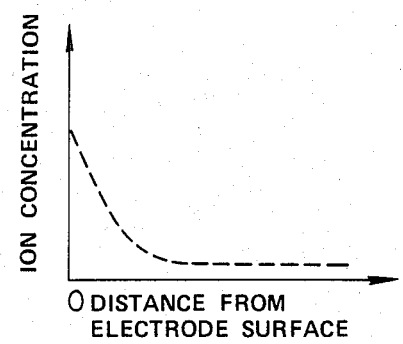
FIG. 1 is an explanatory graph showing a gradient of the concentration of reduced ions with respect to the distance from the cathode surface at an initial stage of an electrolytic reduction process for the electrodeposition of a hexacyano-cobalt iron complex.
Figure 2:
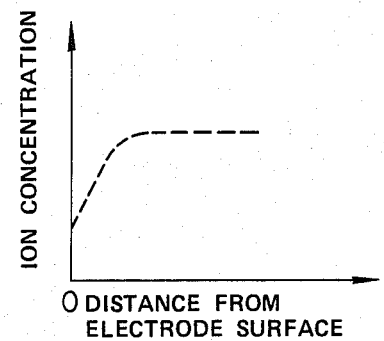
FIG. 2 is an explanatory graph showing a gradient of the concentration of the reduced ions with respect to the distance from the cathode surface at a later stage of the same electrolytic reduction process, assuming that the cathode potential is constant.

At an initial stage of the electrolytic reduction process, the concentration of the reduced ions $X^-$ exhibits a gradient as shown in FIG. 1 with respect to the distance from the cathode surface. When the electrolytic reduction process is performed with a constant current density, the concentration of the reduced ions $X^-$ exhibits a reverse gradient as shown in FIG. 2 at a later stage of the process. If the rate k of the reaction (1) is relatively low compared with the rate k' of the reaction (2), the formation of $X^-$ at the electrode surface becomes insufficient to compensate for the diffusion of $X^-$ and the consumption of $X^-$ in the reaction (2) so that the concentration of $X^-$ in the vicinity of the cathode gradually lowers. With the lapse of time, therefore, the reaction (2) takes place at increasing distances from the cathode surface. This will result in local coarsening of the electrodeposited cyano-complex film, unevenness of the tone or tint of the color of the film and/or a relatively large disperson of the electrodeposition efficiencies in mass production.

When the electrolytic reduction process is performed by sweeping the cathode potential, both k and k' become lower as the potential is raised so that the diffusion of $X^-$ from the electrode surface and the consumption of $X^-$ in the reaction (2) decrease. Therefore, the concentration of $X^-$ in the vicinity of the cathode does not greatly lower even at later stages of the electrolytic reduction process, so that the reaction (2) to form the cyano-complex $X_a$–$Y_b$ takes place always at relatively short distances from the cathode surface. As a result, the electrodeposition of the cyano-complex is accomplished with good and stable efficiency and with improved uniformity of each film of the deposited complex.

The invention will further be illustrated by the following nonlimitative examples.

EXAMPLE 1

Figure 3:
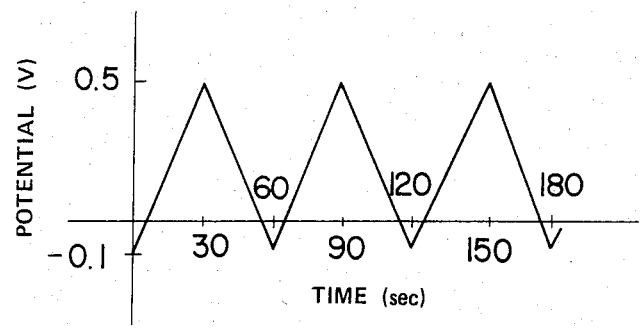
FIG. 3 is a chart showing a saw-tooth wave potential employed in Example 1 of the present invention.
Figure 4:
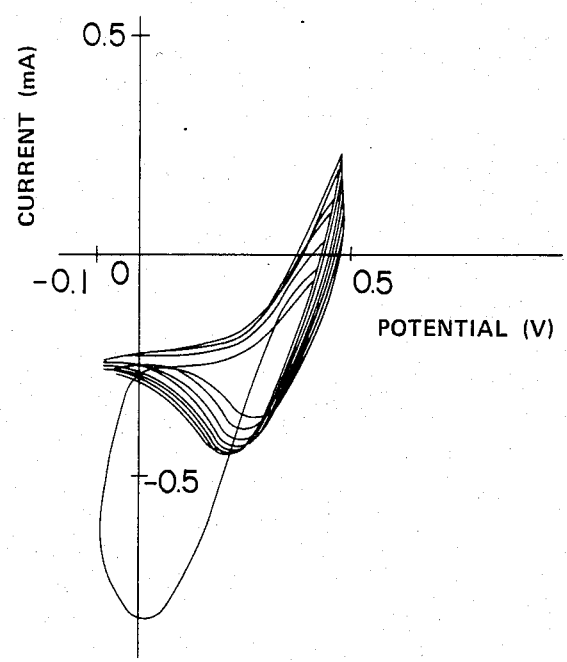
FIG. 4 is a chart showing the manner of changes in the electrolytic reduction current observed in the aforementioned Example 1 where the cathode potential was varied in the manner as shown in FIG. 3.

An electrode was produced by vacuum-depositing a film of $SnO_2$ on a surface of a transparent glass plate. This electrode was submerged in an aqueous mixed solution containing 0.01 mole/liter of $FeCl_3$ and 0.01 mole/liter of $K_3[Co(CN)_6]$ to perform an electrolytic reduction operation with the tin dioxide electrode as the cathode. In the electrolytic reduction operation the cathode potential was repeatedly swept over the range from $-0.1$ to $+0.5$ V at a constant sweep rate of 20 mV/sec. More particularly, the potential was varied in the manner of a saw-tooth wave as shown in FIG. 3. As can be seen, the period of the saw-tooth wave was 60 sec. Due to the sweep of the potential the electrolytic reduction current varied in the manner as shown in FIG. 4.

The electrolytic reduction operation resulted in the electrodeposition of a film of $Fe_x[Co(CN)_6]_y$ on the $SnO_2$ electrode. The hexacyano-cobalt iron complex film was uniform, and there was no perceptible unevenness in the tone or tint of the color of the film. On a number of samples produced by the same method and under the same conditions, the quantity of electricity of the hexacyano-cobalt iron complex film was measured by using an electrolyte solution prepared by dissolving sodium perchlorate in propylene carbonate (concentration 1 mole/liter). On the total samples the dispersion of the quantities of electricity was smaller than 15%, so that the electrodeposition efficiency could be judged to be stable. Additional runs were carried out under generally the same conditions but by varying the rate of the potential sweep over the range from 5 to 100 mV/sec. That is, the period of the aforementioned saw-tooth wave voltage was varied over the range from 240 to 12 sec. The results were almost unchanged.

Figure 5:
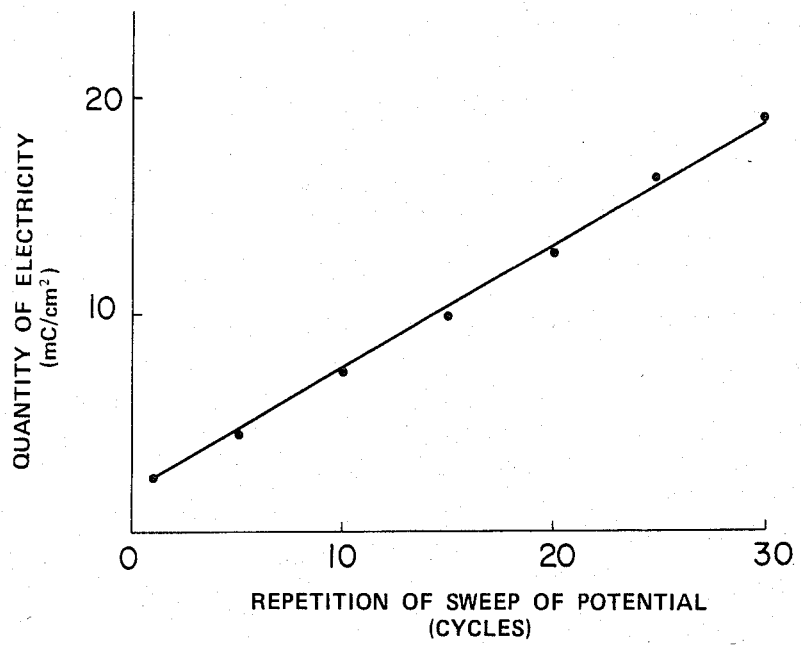
FIG. 5 is a graph showing the relationship between the number of cycles of the sweep of the cathode potential in the manner as shown in FIG. 3 and the quantity of electricity of the electrodeposited cyano-complex film measured in an electrolyte for use in an electrochromic display device.

As a further experiment the sweep of the potential (at the rate of 20 mV/sec) was repeated various times ranging from one cycle to thirty cycles, and it was confirmed that the quantity of electricity of the electrodeposited cyano-complex film increases as the potential sweep is repeated increased times, as shown in FIG. 5. Also it was confirmed that every film of the cyano-complex electrodeposited in this experiment undergoes stable oxidation and reduction reactions in the aforementioned electrolyte.

As a still further experiment the cathode potential was swept over a widened range, i.e. from $-0.2$ to $+1.2$ V. Also in this case the electrodeposited cyano-complex film was uniform and even in the tone and tint of the color, and the electrodeposition efficiency was stable such that the dispersion of the quantities of electricity measured on a number of samples was smaller than 20%. However, when the potential was swept over a further widened range, i.e. from $-0.5$ to $+1.5$ V, the electrodeposited cyano-complex film was electrochemically rather unstable.

EXAMPLE 2

Figure 6:
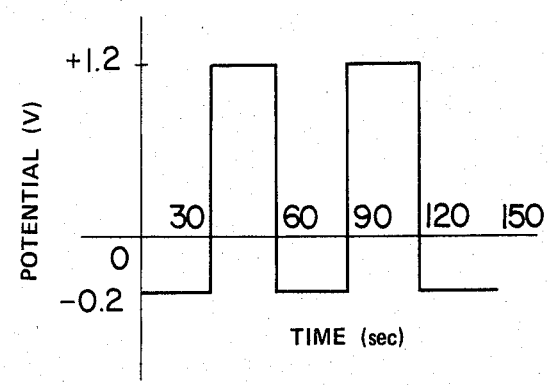
FIG. 6 is a chart showing a rectangular wave potential employed in Example 2 of the present invention.

The electrolytic reduction operation of Example 1 for the electrodeposition of the hexacyano-cobalt iron complex was performed generally similarly except that the sweep of the cathode potential over the range from $-0.2$ to $+1.2$ V was made by applying a rectangular wave potential. As shown in FIG. 6, the period of the rectangular wave was 60 sec. The electrodeposited cyano-complex film was uniform, and there was no perceptible unevenness in the tone or tint of the color of the film. The dispersion of the quantities of electricity measured on a number of samples was as small as about 18%.

As an additional experiment the period of the rectangular wave potential was varied over the range from 20 to 120 sec. In every case the electrodeposition of the cyano-complex was accomplished with almost similarly good and stable efficiencies

EXAMPLE 3

Figure 7:
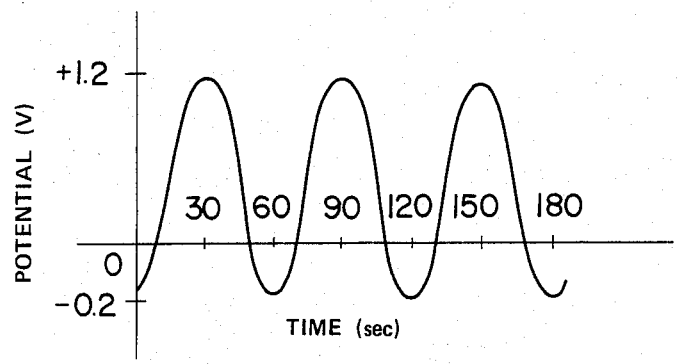
FIG. 7 is a chart showing a sinusoidal wave potential employed in Example 3 of the present invention.

The electrolytic reduction operation of Example 1 was performed generally similarly except that the sweep of the cathode potential over the range from $-0.2$ to $+1.2$ V was made by applying a sinusoidal wave potential. As shown in FIG. 7, the period of the sinusoidal wave was 60 sec. The electrodeposited hexacyano-cobalt iron complex film was uniform, and there was no perceptible unevenness in the tone or tint of the color of the film. The dispersion of the quantities of electricity measured on a number of samples was not larger than 20%.

As an additional experiment the period of the sinusoidal wave potential was varied over the range from 30 to 600 sec. In every case the electrodeposition of the cyano-complex was accomplished with almost similarly good and stable efficiencies.

What is claimed is:

1. A method of electrodepositing a hexacyano-cobalt iron complex expressed by the general formula $Fe_x[Co(CN)_6]_y$, where $3 \leq x \leq 4$ and $2 \leq y \leq 3$, by electrolytic reduction from an aqueous mixed solution of an iron-(III) salt and potassium cobalt hexacyanide, characterized in that during electrolytic reduction the cathode potential is periodically increased and decreased over a predetermined range.

2. A method according to claim 1, wherein said predetermined range is from about −0.2 V to about +1.2 V.

3. A method according to claim 2, wherein the cathode potential is varied in the manner of a saw-tooth wave.

4. A method according to claim 2, wherein the cathode potential is varied in the manner of a rectangular wave.

5. A method according to claim 2, wherein the cathode potential is varied in the manner of a sinusoidal wave.

6. A method according to claim 2, wherein one cycle of the periodic change of the cathode potential takes a time in the range from about 10 sec to about 600 sec.

7. A method according to claim 1, wherein said iron-(III) salt is ferric chloride.

* * * * *